(12) United States Patent
Nishiwaki et al.

(10) Patent No.: US 12,162,313 B2
(45) Date of Patent: Dec. 10, 2024

(54) TIRE

(71) Applicant: Sumitomo Rubber Industries, Ltd., Kobe (JP)

(72) Inventors: Takashi Nishiwaki, Kobe (JP); Sho Ito, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 104 days.

(21) Appl. No.: 18/087,909

(22) Filed: Dec. 23, 2022

(65) Prior Publication Data

US 2023/0202240 A1  Jun. 29, 2023

(30) Foreign Application Priority Data

Dec. 27, 2021  (JP) ................................. 2021-212657

(51) Int. Cl.
*B60C 11/12*  (2006.01)
*B60C 11/13*  (2006.01)
*B60C 11/03*  (2006.01)

(52) U.S. Cl.
CPC ...... *B60C 11/1236* (2013.01); *B60C 11/1369* (2013.01); *B60C 2011/0341* (2013.01); *B60C 2011/0358* (2013.01)

(58) Field of Classification Search
CPC ............. B60C 11/1236; B60C 11/1369; B60C 2011/0358

See application file for complete search history.

(56) References Cited

U.S. PATENT DOCUMENTS

| 4,690,189 A * | 9/1987 | Bradisse | B60C 11/1369 |
| | | | 152/209.15 |
| 2002/0005238 A1* | 1/2002 | Boiocchi | B60C 11/0318 |
| | | | 152/209.27 |
| 2012/0267022 A1* | 10/2012 | Tagashira | B60C 11/0309 |
| | | | 152/209.25 |
| 2023/0122026 A1* | 4/2023 | Miura | B60C 11/01 |
| | | | 152/209.1 |

FOREIGN PATENT DOCUMENTS

| EP | 2 465 706 A2 | 6/2012 |
| EP | 2 465 706 A3 | 8/2012 |
| EP | 2 591 923 A2 | 5/2013 |

(Continued)

OTHER PUBLICATIONS

Machine translation for Japan 2015-137015 (Year: 2024).*

(Continued)

*Primary Examiner* — Steven D Maki
(74) *Attorney, Agent, or Firm* — Birch, Stewart, Kolasch & Birch, LLP

(57) ABSTRACT

A tire comprises a tread portion including a shoulder land portion. The shoulder land portion is provided with shoulder lateral grooves extending from a shoulder circumferential groove to a first tread edge to divide the shoulder land portion into shoulder blocks. The axial width of the ground contacting top surface of each shoulder block is 35% to 48% of a half tread width from the tire equator to the first tread edge. The ground contacting top surface of each shoulder block is provided with only one or more shoulder sipes extending in a tire circumferential direction.

20 Claims, 5 Drawing Sheets

(56) References Cited

FOREIGN PATENT DOCUMENTS

| EP | 2 610 081 A2 | | 7/2013 | | |
|----|----|----|----|----|----|
| EP | 2 591 923 A3 | | 5/2014 | | |
| EP | 2 610 081 A3 | | 12/2017 | | |
| EP | 3 375 635 A1 | | 8/2018 | | |
| JP | 04-317805 A | * | 11/1992 | ......... | B60C 11/0318 |
| JP | 05-305802 A | * | 11/1993 | | |
| JP | 2001-277814 A | * | 10/2001 | ......... | B60C 11/1369 |
| JP | 2010-100095 A | | 5/2010 | | |
| JP | 2011-84254 A | | 4/2011 | | |
| JP | 2015-137015 A | * | 7/2015 | | |
| JP | 2018-90230 A | | 6/2018 | | |
| WO | WO-95/18022 A1 | * | 7/1995 | ......... | B60C 11/0309 |

OTHER PUBLICATIONS

Machine translation for Japan 2010-100095 (Year: 2024).*
Machine translation for Japan 2001-277814 (Year: 2024).*
Machine translation for Japan 05-305802 (Year: 2024).*
Translation for Japan 04-317805 (Year: 2024).*
Extended European Search Report for European Application No. 22196953.8, dated Mar. 3, 2023.

* cited by examiner

TIRE

BACKGROUND OF THE INVENTION

Field of the Invention

The present disclosure relates to a tire.

Background Art

The following Patent Document 1 discloses a pneumatic tire in which shoulder blocks are specifically designed to prevent the vehicle from overturning when turning.
In this tire, the loss tangent and the lateral rigidity of the shoulder blocks are adjusted in order to reduce the cornering force by the shoulder blocks when the vehicle rolls largely, thereby preventing the overturning.
Patent Document 1: Japanese Patent Application Publication No. 2015-137015

SUMMARY OF THE INVENTION

Problems to be Solved by the Invention

When the cornering force by the shoulder blocks is reduced in order to improve the resistance to vehicle overturning as in the above-mentioned pneumatic tire, wear resistance of the shoulder blocks is liable to reduce.
The present disclosure was made in view of the above circumstances, and a primary objective of the present disclosure is to provide a tire in which the resistance to vehicle overturning can be effectively improved, while maintaining wear resistance of shoulder blocks.

Means for Solving the Problems

According to the present disclosure, a tire comprises
a tread portion having a first tread edge, and provided with a shoulder circumferential groove disposed adjacently to the first tread edge and extending continuously in the tire circumferential direction, so as to define a shoulder land portion between the shoulder circumferential groove and the first tread edge.
wherein
the shoulder land portion is provided with shoulder lateral grooves extending from the shoulder circumferential groove to the first tread edge, so as to circumferentially divide the shoulder land portion into shoulder blocks,
each of the shoulder blocks is provided with one or more shoulder sipes each extending from one of the shoulder lateral grooves and ending within the shoulder block,
the shoulder lateral grooves include a tie-bar-equipped shoulder lateral groove provided with at least one tie bar rising from the groove bottom so as to connect between two of the shoulder blocks adjacent to the tie-bar-equipped shoulder lateral groove,
the width in the tire axial direction of the ground contacting top surface of each of the shoulder blocks is in a range from 35% to 48% of a half tread width between the first tread edge and the tire equator, and
the ground contacting top surface of each of the shoulder blocks is provided with one or more shoulder sipes extending in the tire circumferential direction.

Effects of the Invention

In the present disclosure, therefore, the tire can exhibit excellent resistance to vehicle overturning while maintaining the wear resistance of the shoulder blocks.

DETAILED DESCRIPTION OF THE INVENTION

Figure 1:
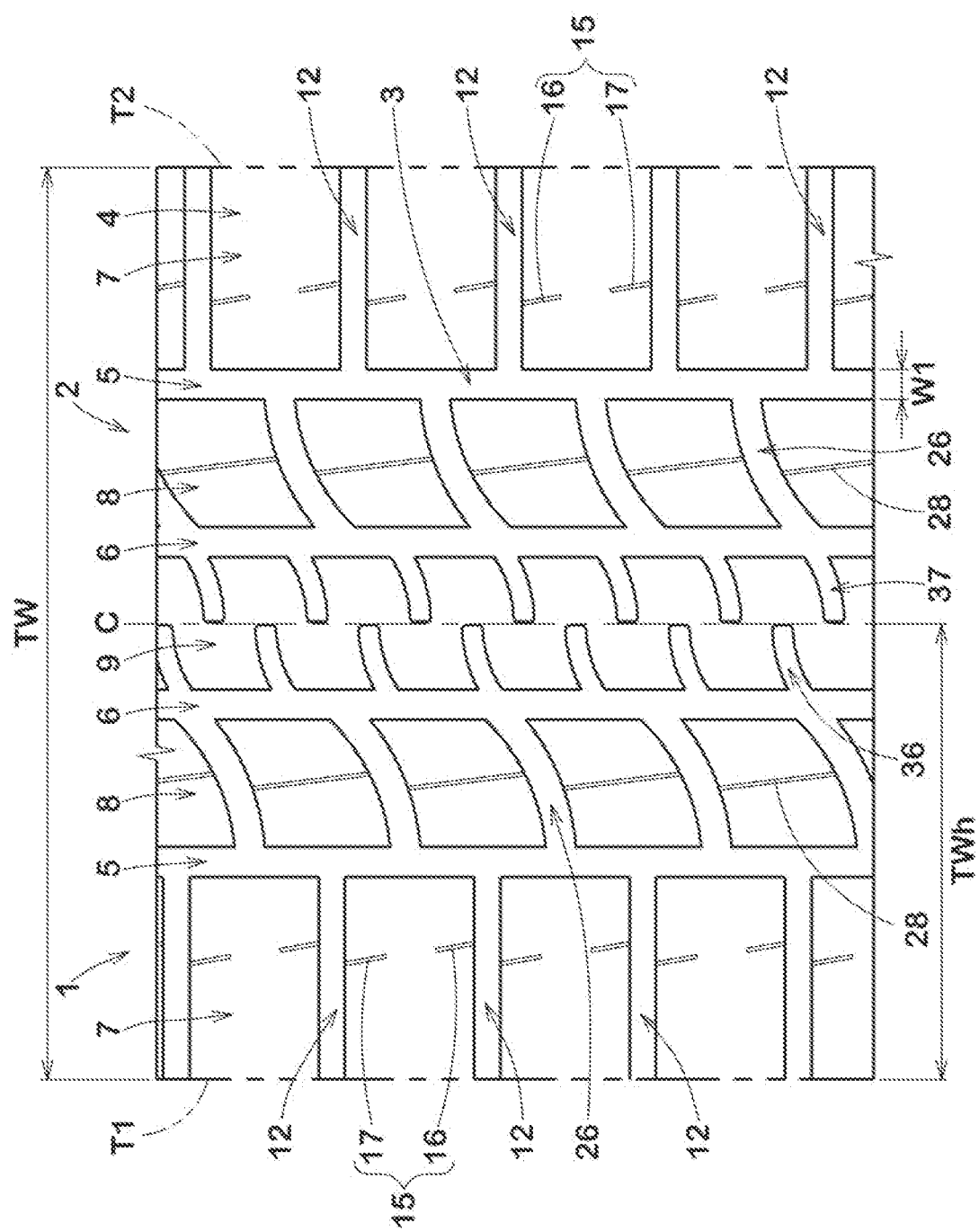
FIG. 1 is a developed partial view of the tread portion of a tire as an embodiment of the present disclosure.

The present disclosure is suitably applied to pneumatic tires for passenger cars, but the present disclosure may be applied to pneumatic tires for heavy duty vehicles such as trucks and buses, as well as non-pneumatic tires so called airless tire.
Taking a pneumatic tire for a passenger car as an example, an embodiment of the present disclosure will be described in detail in conjunction with accompanying drawings.
FIG. 1 is a developed partial view of the tread portion 2 of a tire 1 as an embodiment of the present disclosure.
The tire 1 comprises a tread portion 2 having a first tread edge T1 and a second tread edge T2.
The tread portion 2 is provided with circumferential grooves 3 disposed between the first tread edge T1 and the second tread edge T2 and extending continuously in the tire circumferential direction.
The tread portion 2 comprises land portions 4 axially divided by the circumferential grooves 3. In the present embodiment, the tread portion 2 is provided with four circumferential grooves 3, and thereby, divided into five land portions 4 as shown in FIG. 1.
The present disclosure is however, not limited to such tread pattern. For example, the tread portion 2 may be divided into four land portions 4 by three circumferential grooves 3.
In the present embodiment, the tire 1 is bidirectional, and not specified which side should be outboard when the tire is attached to a vehicle.
For convenience, in each of the figures herein, the first tread edge T1 is shown as the tread edge on the left side of the tire equator C, and the second tread edge T2 is shown as the tread edge on the right side of the tire equator C.
It is preferable that a half of the tread portion 2 between the first tread edge T1 and the tire equator C has substantially the same configuration as a half of the tread portion 2 between the second tread edge T2 and the tire equator C.
It is preferable that the tread portion 2 has a point-symmetrical tread pattern.
The first tread edge T1 and the second tread edge T2 correspond to the axially outermost edges of the ground contacting patch of the tire 1 when the tire 1 under its normal state is loaded by a normal load and the tread portion 2 is contacted with a flat horizontal surface at a camber angle of 0 degrees.

In the case of a pneumatic tire for which various standards have been established, the "normal state" means a state of the tire which is mounted on a normal rim and inflated to a normal pressure, but loaded with no tire load.

In the case of tires for which no standard is established such as airless tires, the "normal state" means a standard usage state according to the purpose of use of the tire, which is not mounted on the vehicle and loaded with no load.

In the present disclosure, unless otherwise noted, dimensions, positions and the like of the tire refer to those under the normal state.

The normal rim is a wheel rim officially approved or recommended for the tire by standards organizations, i.e. JATMA (Japan and Asia). T&RA (North America). ETRTO (Europe), TRAA (Australia). STRO (Scandinavia), ALAPA (Latin America), ITTAC (India) and the like which are effective in the area where the tire is manufactured, sold or used.

The normal pressure is the air pressure officially approved or recommended for the tire by standards organizations. i.e. JATMA (Japan and Asia), T&RA (North America), ETRTO (Europe), TRAA (Australia), STRO (Scandinavia). ALAPA (Latin America), ITTAC (India) and the like which are effective in the area where the tire is manufactured, sold or used.

In the case of a pneumatic tire for which various standards have been established, the "normal load" is a load specified for the tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

In the case of tires for which no standard is established, the "normal load" refers to the maximum load applicable to the tire.

The circumferential grooves 3 include two shoulder circumferential grooves 5 and two crown circumferential grooves 6.

The two shoulder circumferential grooves 5 are disposed adjacently to the first tread edge T1 and second tread edge T2, respectively.

The two crown circumferential grooves 6 are disposed between the shoulder circumferential grooves 5, and one on each side of the tire equator.

In the present embodiment, each of the circumferential grooves 3 is a straight groove extending in parallel with the tire circumferential direction.

However, all of or some of the circumferential grooves 3 may be non-straight grooves, for example, zigzag or wavy grooves.

It is preferable that the groove width W1 of each of the circumferential grooves 3 is at least 3 mm.

Further, it is preferable that the groove width W1 of each of the circumferential grooves 3 is set in a range from 3.0% to 5.0% of the tread width TW.

The tread width TW is the distance in the tire axial direction between the first tread edge T1 and the second tread edge T2 in the normal state.

The land portions 4 include two shoulder land portions 7. The two shoulder land portions 7 comprise the first tread edge T1 and the second tread edge T2, respectively, and are defined on the axially outside of the respective shoulder circumferential grooves 5.

The two shoulder land portions 7 have substantially the same configuration.

The land portions 4 further include two middle land portions 8 and one crown land portion 9.

The two middle land portions 8 are positioned adjacently to the respective shoulder land portions 7 via the shoulder circumferential grooves 5.

The two middle land portions 8 are respectively defined between the crown circumferential groove 6 and the respective shoulder circumferential grooves 5.

The two middle land portions 8 have substantially the same configuration.

The crown land portion 9 is defined between the two crown circumferential grooves 6 and positioned on the tire equator C.

Figure 2:
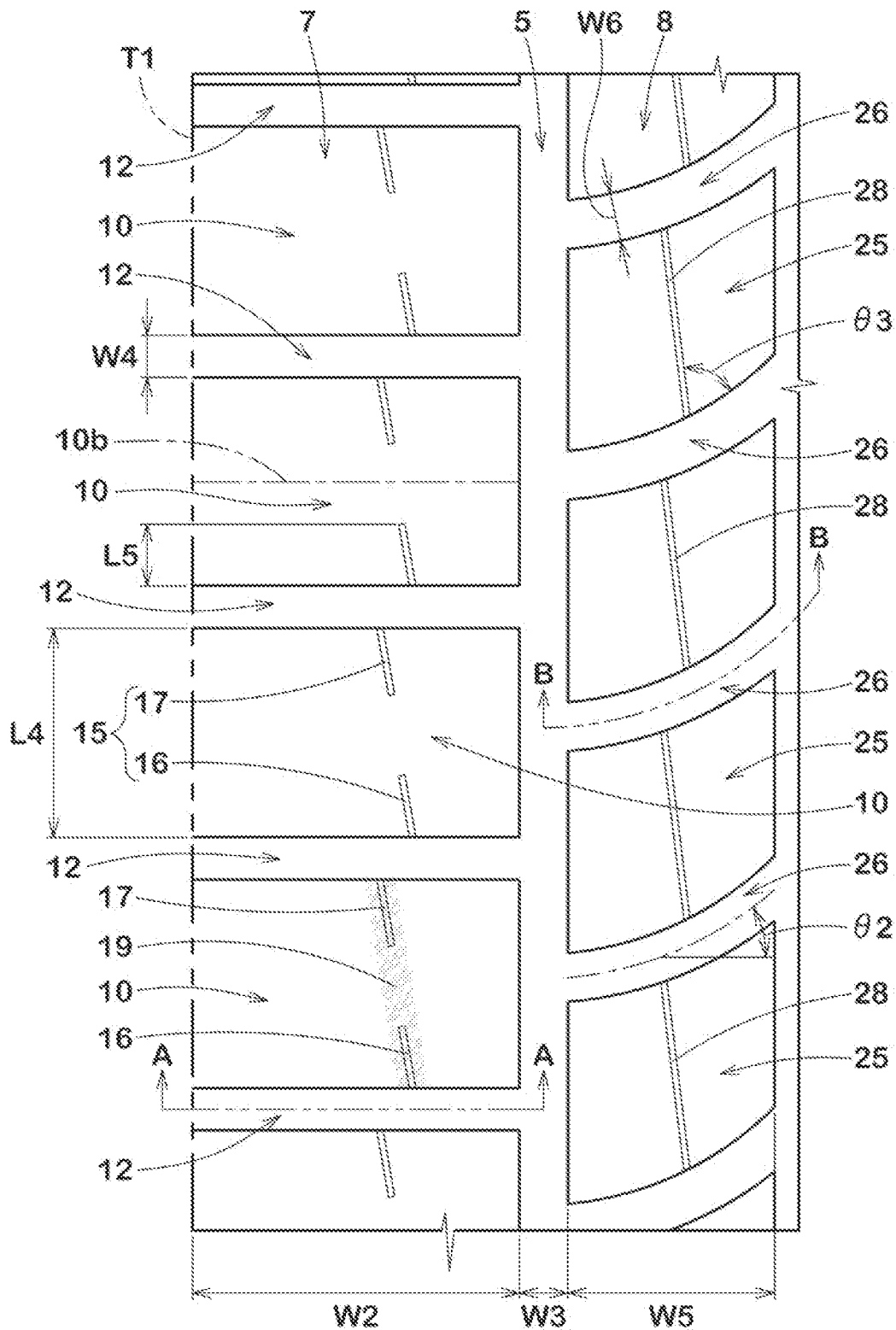
FIG. 2 is an enlarged view showing a shoulder land portion and a middle land portion shown in FIG. 1.

FIG. 2 shows the shoulder land portion 7 and the middle land portion 8 which are disposed on the first tread edge T1 side of the tire equator C.

As shown in FIG. 2, the shoulder land portion 7 is provided with lateral grooves 12 extending from the shoulder circumferential groove 5 to the first tread edge T1.

Thereby, the shoulder land portion 7 is circumferentially divided into shoulder blocks 10 by the shoulder lateral grooves 12.

In the present disclosure, the width W2 in the tire axial direction of the ground contacting top surface of each of the shoulder blocks 10 is set in a range from 35% to 48% of a half tread width TWh.

The half tread width TWh is the distance in the tire axial direction from the tire equator C to the first tread edge T1 under the normal state of the tire, and corresponds to a half of the above-mentioned tread width TW.

Figure 3:
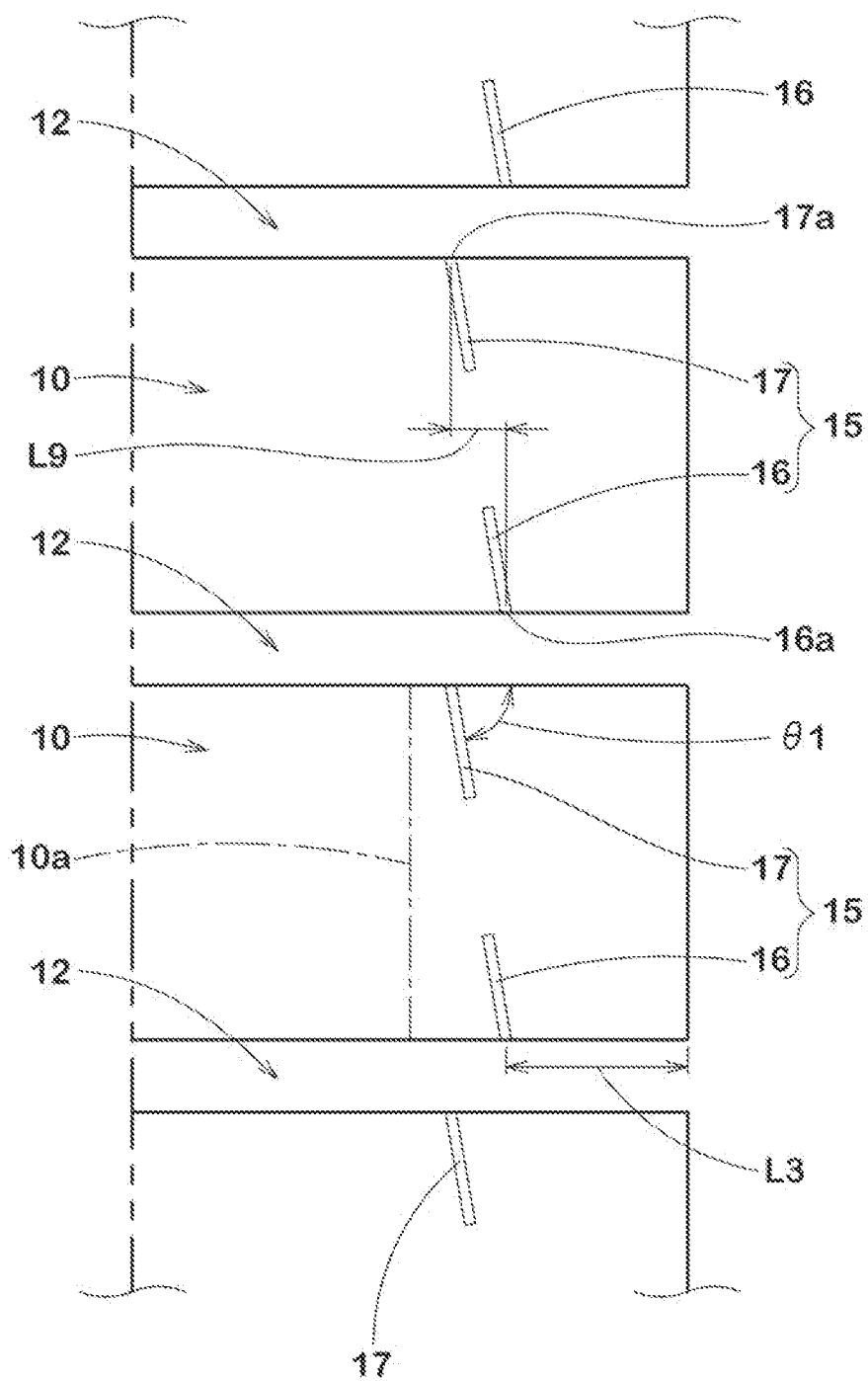
FIG. 3 is an enlarged view showing shoulder blocks and shoulder lateral grooves shown in FIG. 2.

FIG. 3 shows three of the shoulder lateral grooves 12 and two of the shoulder blocks 10. As shown in FIG. 3, the ground contacting top surface of each of the shoulder blocks 10 is provided with one or more shoulder sipes 15 extending in the tire circumferential direction.

The term "sipe" means an incision having a small width and having two opposite side walls, the two opposite side walls extend substantially parallel to each other, and the width W2 between the two opposite side walls is 2.0 mm or less.

Further, the expression "substantially parallel" means that the angle between the two opposite side walls is 10 degrees or less.

Preferably, the width W2 of the sipe is 0.5 to 1.5 mm, more preferably 0.5 to 1.0 mm.

In the present embodiment, the width W2 of the sipe is constant from the opening to the bottom thereof.

However, the present disclosure is not limited to such constant width. For example, the width of the sipe may be increased near the open top of the sipe by providing a chamfer for the sipe edge or edges.

Further, the width of the sipe may be increased near the bottom of the sipe so as to have a flask-shaped cross sectional shape.

Further, the expression "the shoulder sipe 15 extending in the tire circumferential direction" means that the maximum angle of the center line of the shoulder sipe 15 with respect to the tire circumferential direction is not more than 30 degrees in its top view.

Further, the expression "the ground contacting top surface of each of the shoulder blocks 10 is provided with one or more shoulder sipes 15" means that the ground contacting top surface of each of the shoulder blocks 10 is not provided with a locally depressed portion such as groove, sipe and recess, except for the shoulder sipe or sipes 15.

In the tire 1 according to the present disclosure, by adopting the above configuration, it is possible to exhibit excellent resistance to vehicle overturning while maintaining the wear resistance of the shoulder blocks 10. The mechanism is as follows.

In the tire 1 of the present disclosure, since the axial width W2 of the ground contacting top surface of each of the shoulder blocks 10 is in a range from 35% to 48% of the half tread width TWh, the rigidity of the shoulder blocks 10 is optimized. As a result, it is possible to improve the resistance to vehicle overturning while maintaining the wear resistance of the shoulder blocks 10.

Further, since the ground contacting top surface of each of the shoulder blocks 10 is provided with one or more shoulder sipes 15 extending in the tire circumferential direction, the rigidity in the tire axial direction of the shoulder blocks 10 is reduced, and thereby the resistance to vehicle overturning is improved.

On the other hand, the rigidity in the tire circumferential direction of the shoulder blocks 10 is not reduced by the shoulder sipes 15 and is maintained, so the wear resistance of the shoulder blocks 10 can be maintained.

In the present disclosure, owing to such mechanism, the resistance to vehicle overturning can be improved while maintaining the wear resistance of the shoulder blocks 10.

Hereinafter, the present embodiment will be described in more detail.

Each configuration described below shows a specific example for the present embodiment. Therefore, even if the tire does not have the configuration described below, the tire will exert the above-mentioned effects of the present disclosure.

Further, even if any one of the configurations described below is independently applied to the tire having the above-mentioned configurations of the present disclosure, improvement in performance according to the applied configuration can be expected.

Further, when some of the configurations described below are applied in combination, to the tire having the above-mentioned configurations of the present disclosure, multiple effect according to the applied configurations on the improvement in performance can be expected.

It is preferable that the width W2 (shown in FIG. 2) in the tire axial direction of the ground contacting top surface of each of the shoulder blocks 10 is set in a range from 40% to 45% of the half tread width TWh.

Further, the length L4 in the tire circumferential direction of the ground contacting top surface of each of the shoulder blocks 10 is smaller than the width W2 in the tire axial direction of the ground contacting top surface.

Specifically, the length L4 is in a range from 60% to 75% of the width W2.

Thus, the ground contacting top surface of the shoulder block 10 is long in the tire axial direction. Preferably, the ground contacting top surface has a rectangular shape.

The shoulder lateral grooves 12 in this example are arranged at an angle of not more than 30 degrees, preferable not more than 20 degrees, more preferably not more than 10 degrees with respect to the tire axial direction.

Most preferably, and in the present embodiment, the shoulder lateral grooves 12 extend parallel with the tire axial direction. Thereby, wear of the shoulder block 10 is suppressed.

In order to maintain the wear resistance of the shoulder blocks 10, the shoulder lateral groove 12 extends in the tire axial direction with a constant groove width from the shoulder circumferential groove 5 to the first tread edge T1. Further, it is preferable that the groove width W4 of the shoulder lateral groove 12 is smaller than the groove width W3 of the shoulder circumferential groove 5.

Specifically, the groove width W4 of the shoulder lateral groove 12 is in a range from 85% to 95% of the groove width W3 of the shoulder circumferential groove 5.

Figure 4:
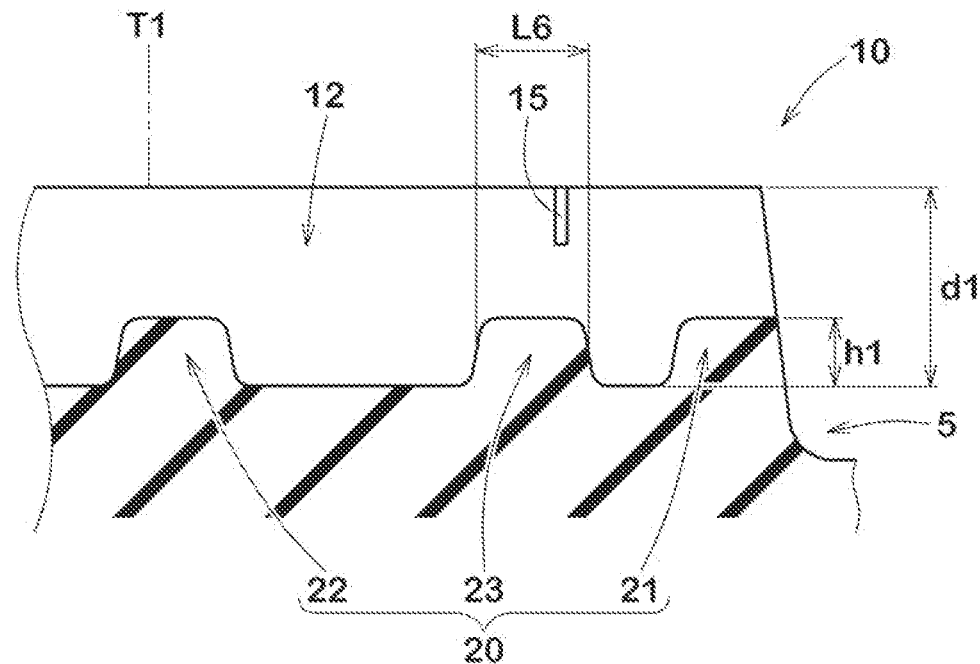
FIG. 4 is a cross-sectional view taken along line A-A of FIG. 2.

FIG. 4 shows a cross-sectional view taken along line A-A of FIG. 2.

The shoulder lateral grooves 12 include a tie-bar-equipped shoulder lateral groove 12 which is, as shown in FIG. 4, provided with tie bars 20 raising from the groove bottom so as to connect between two of the shoulder blocks 10 adjacent to each other through the tie-bar-equipped shoulder lateral groove 12. Such tie bars 20 can further improve the wear resistance. In FIGS. 1 to 3, the tie bars 20 are omitted from the shoulder lateral grooves 12 for the sake of simplicity.

In this example, the tie bars 20 include an axially inner tie bar 21, an axially outer tie bar 22 and an intermediate tie bar 23.

The axially inner tie bar 21 is disposed axially inside a center position in the tire axial direction of the tie-bar-equipped shoulder lateral groove 12, wherein the center position is that of the center between the axially inner end at the shoulder circumferential groove 5 and the axially outer end at the first tread edge.

Preferably, the axially inner tie bar 21 is disposed at the axially inner end of the tie-bar-equipped shoulder lateral groove 12.

Such inner tie bar 21 serves for suppressing uneven wear occurring near the axially inner end portion of the tie-bar-equipped shoulder lateral groove 12.

The axially outer tie bar 22 is disposed axially outside the above-mentioned center position of the tie-bar-equipped shoulder lateral groove 12.

Preferably, the outer tie bar 22 is disposed at the shoulder lateral groove's axially outer end at the first tread edge.

Specifically, in a cross section of the tie-bar-equipped shoulder lateral groove 12 taken along the length direction of the tie-bar-equipped shoulder lateral groove 12, when a zone which extends radially outwardly from the radially outer surface of the outer tie bar 22 while keeping a constant width equal to the width of the radially outer surface, is set, the first tread edge T1 is included in this zone.

In other words, the first tread edge T1 is included in the extent of the radially outer surface of the outer tie bar 22 in the length direction of the tie-bar-equipped shoulder lateral groove 12. Such outer tie bars 22 serve for suppressing uneven wear occurring near the first tread edge T1.

The intermediate tie bar 23 is disposed between both ends in the tire axial direction of the shoulder lateral groove 12, and between the axially outer tie bar 22 and the axially inner tie bar 21.

It is preferable that the distance between the intermediate tie bar 23 and the axially inner tie bar 21 is smaller than the distance between the intermediate tie bar 23 and the axially outer tie bar 22. Such intermediate tie bar 23 can effectively suppress the shoulder lateral groove 12 from opening excessively, and can further improve the wear resistance.

The shoulder lateral groove 12 in the present embodiment is provided with only the axially inner tie bar 21, axially outer tie bar 22, and intermediate tie bar 23.

But, the present disclosure is not limited to such arrangement. For example, the shoulder lateral groove 12 may be provided with only one of these tie bars 20, or only two of these tie bars 20.

The length L6 in the tire axial direction of one tie bar 20 is, for example, set in a range from 15% to 25% of the axial width W2 of the ground contacting top surface of the shoulder block 10.

Further, it is preferable that the total axial length of all the tie bars 20 disposed in one shoulder lateral groove 12 is set in a range from 40% to 60% of the axial width W2 of the ground contacting top surface of the shoulder block 10.

Thereby, the wear resistance and the ride comfort performance are improved in a well-balanced manner.

Here, the axial length of the tie bar 20 is measured at the center position in the radial height direction of the tie bar 20.

In the present embodiment, the axially inner tie bar 21, the axially outer tie bar 22, and the intermediate tie bar 23 have the same radial height h1.

Preferably, the radial height h1 is set in a range from 25% to 60%, more preferably 30% to 50% of the maximum depth d1 of the shoulder lateral groove 12.

In the present embodiment, as shown in FIG. 3, each shoulder sipe 15 extends from one of the shoulder lateral grooves 12 and ends within the shoulder block 10.

The angle of the shoulder sipe 15 with respect to the tire circumferential direction is preferably set in a range from 5 to 15 degrees.

As a result, while maintaining the rigidity in the tire circumferential direction of the shoulder block 10, the rigidity in the tire axial direction of the shoulder block 10 can be relaxed, and the resistance to vehicle overturning performance is further improved.

As shown in FIG. 4, the shoulder sipe 15 is connected to the shoulder lateral groove 12 at the formation position of one of the plurality of tie bars 20.

In the present embodiment, the shoulder sipe 15 is connected to the shoulder lateral groove 12 at the forming position of the intermediate tie bar 23. Thereby, it is possible to further improve the wear resistance.

The expression "at the formation position of the tie bar 20" means that the shoulder sipe 15 is included in a zone, which extends radially outwardly from the radially outer surface of the tie bar 20 while keeping a constant width equal to that of the radially outer surface, in the cross section of the tie-bar-equipped shoulder lateral groove 12 taken along the length direction of the groove 12. The boundary between the radially outer surface and the other surface of the tie bar 20 is lies at the center position of the tie bar 20 in the radial height direction.

In the present embodiment, as shown in FIG. 3, the above-said at least one shoulder sipe 15 includes a first shoulder sipe 16 and a second shoulder sipe 17.

Preferably, each of the shoulder blocks 10 is provided with one first shoulder sipe 16 and one second shoulder sipe 17. In each of the shoulder blocks 10, the first shoulder sipe 16 is connected to one of the tie-bar-equipped shoulder lateral grooves 12 which is positioned on one side of the shoulder block 10 in the tire circumferential direction (lower side in FIG. 3), and the second shoulder sipe 17 is connected to one of the tie-bar-equipped shoulder lateral grooves 12 which is positioned on the other side of the shoulder block 10 in the tire circumferential direction (upper side in FIG. 3).

Further, both the first shoulder sipe 16 and the second shoulder sipe 17 are connected to the respective tie-bar-equipped shoulder lateral grooves 12 at the respective formation positions of the intermediate tie bars 23. Thereby, the ride comfort performance is improved, while the above-mentioned effects are exhibited.

It is preferable that the first shoulder sipe 16 and the second shoulder sipe 17 are disposed axially inside a center line 10a of the shoulder block 10 in the tire axial direction (in FIG. 3, the center line is indicated by alternate long and short dash line).

More specifically, the edges of the first shoulder sipe 16 and the edges of the second shoulder sipe 17 are completely positioned axially inside the center line 10a.

Therefore, the rigidity of the shoulder block 10 is relaxed in its axially inside region, and as a result, the ride comfort performance is further improved.

On the other hand, if the first shoulder sipe 16 and the second shoulder sipe 17 are disposed excessively close to the shoulder circumferential groove 5, there is a possibility that uneven wear occurs on the shoulder block 10.

Therefore, the axial distance L3 from the connecting position 16a of the first shoulder sipe 16 with the shoulder lateral groove 12 to the axially inner end of the shoulder lateral groove 12 is preferably set in a range from 30% to 45% of the axial width W2 of the ground contacting top surface of the shoulder block 10. And the axial distance L3 from the connecting position 17a of the second shoulder sipe 17 with the shoulder lateral groove 12 to the axially inner end of the shoulder lateral groove 12 is preferably set in a range from 30% to 45% of the axial width W2 of the ground contacting top surface of the shoulder block 10.

It is preferable that the connecting position 17a of the second shoulder sipe 17 with the shoulder lateral groove 12 is displaced in the tire axial direction from the connecting position 16a of the first shoulder sipe 16 with the shoulder lateral groove 12.

The distance L9 in the tire axial direction between the connecting position 16a and the connecting position 17a is preferably set in a range from 5% to 10% of the axial width W2 of the ground contacting top surface of the shoulder block 10.

Thereby, it becomes possible to further improve the wear resistance of the shoulder blocks 10.

In order to further improve the wear resistance of the shoulder blocks 10, it is preferred that the first shoulder sipe 16 and the second shoulder sipe 17 are inclined in the same direction with respect to the tire circumferential direction.

In the present embodiment, the first shoulder sipe 16 and the second shoulder sipe 17 are inclined at the same angle with respect to the tire circumferential direction.

Preferably, the angle θ1 between the shoulder lateral groove 12 and the shoulder sipe 15 is set in a range from 25 to 85 degrees.

In each of the shoulder blocks 10, the first shoulder sipe 16 and the second shoulder sipe 17 are arranged such that the first shoulder sipe 16 and the second shoulder sipe 17 are positioned within a narrow zone 19.

The narrow zone 19 is shown in FIG. 2 by shading with small dots.

As shown, the narrow zone 19 extends with a constant width and is inclined in the substantially same direction as the first shoulder sipe 16 and the second shoulder sipe 17 in the top view of the shoulder block 10.

The constant width of the narrow zone 19 is preferably not more than 10 mm.

In this example, in order to further improve the ride comfort performance, the first shoulder sipe 16 and the second shoulder sipe 17 are arranged so as to extend substantially on a straight line. In this case, the width of the narrow zone 19 can be the substantially same as the width of the sipes 16 and 17.

It is preferable that each shoulder sipe 15 (16, 17) ends within the shoulder block 10 without crossing the center line 10b of the shoulder block 10 in the tire circumferential direction (indicated by the alternate long and short dash line in FIG. 2).

It is preferable that the length L5 in the tire circumferential direction of the shoulder sipe 15 is set in a range from 25% to 35% of the length L4 in the tire circumferential direction of the shoulder block 10. Such shoulder sipes 15 serve for improving the wear resistance and the ride comfort performance in a well-balanced manner.

Each of the middle land portions 8 is provided with middle lateral grooves 26 as shown in FIG. 2.

The middle lateral grooves 26 extend across the entire axial width of the middle land portion 8. Thereby, the middle land portion 8 is circumferentially divided into middle blocks 25.

It is preferable that the width W5 in the tire axial direction of the ground contacting top surface of the middle block 25 is smaller than the width W2 in the tire axial direction of the ground contacting top surface of the shoulder block 10. Specifically, the axial width W5 of the ground contacting top surface of the middle block 25 is in a range from 55% to 70% of the axial width W2 of the ground contacting top surface of the shoulder block 10.

As a result, the progress of wear of the shoulder blocks 10 and that of the middle blocks 25 becomes uniform, and uneven wear thereof is suppressed.

The middle lateral grooves 26 in the present embodiment are inclined with respect to the tire axial direction.

The angle θ2 of the middle lateral grooves 26 with respect to the tire axial direction is larger than the angle of the shoulder lateral grooves 12 with respect to the tire axial direction.

In the middle lateral grooves 26 in the present embodiment, the angle θ2 with respect to the tire axial direction increases toward the inside in the tire axial direction, wherein, the angle θ2 is in a range from 10 to 45 degrees, for example. As a result, the middle lateral grooves 26 are curved convexly toward one side in the tire circumferential direction (lower side in FIG. 2) on the first tread edge T1 side of the tire equator. Such middle lateral grooves 26 can enhance the wet performance in addition to the improvement of the wear resistance and the ride comfort performance.

In the present embodiment, the groove width W6 of the middle lateral grooves 26 is larger than the groove width W4 of the shoulder lateral grooves 12.

Specifically, the groove width W6 of the middle lateral grooves 26 is in a range from 110% to 130% of the groove width W4 of the shoulder lateral grooves 12.

Thereby, the progress of wear of the shoulder land portion 7 and that of the middle land portion 8 become uniform, and uneven wear these portions is suppressed.

Figure 5:
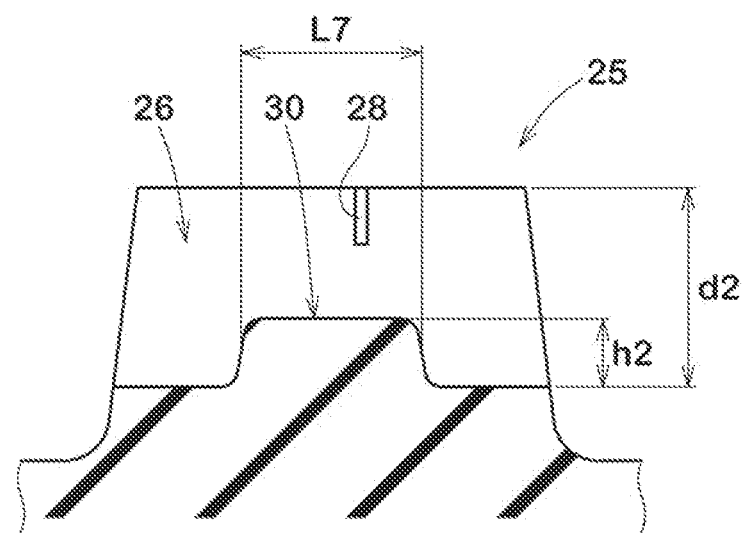
FIG. 5 is a cross-sectional view taken along line B-B of FIG. 2.

FIG. 5 shows a cross-sectional view taken along line B-B of FIG. 2.

The middle lateral grooves 26 include a tie-bar-equipped middle lateral groove 28 which is, as shown in FIG. 5, provided with at least one middle tie bar 30 raising from the groove bottom so as to connect between two of the middle blocks 25 adjacent to each other through the tie-bar-equipped middle lateral groove 28.

Preferably, and in the present embodiment, each of the middle lateral grooves 26 is provided with only one middle tie bar 30.

The middle tie bar 30 serves for increasing the rigidity of the middle land portion 8 in the tire circumferential direction and improving the wear resistance.

In the present embodiment, only one middle tie bar 30 is disposed between both ends in the tire axial direction of the middle lateral groove 26.

However, the present disclosure is not limited to such arrangement. For example, a plurality of middle tie bars 30 may be disposed in one middle lateral groove 26.

The length L7 in the tire axial direction of the single middle tie bar 30 is, for example, set in a range from 40% to 55% of the width W5 (shown in FIG. 2) in the tire axial direction of the middle block 25.

The maximum height h2 of the middle tie bar 30 is set in a range from 25% to 40% of the maximum depth d2 of the middle lateral groove 26.

Further, in the present embodiment, the middle tie bar 30 is disposed so as to extend across the center position in the tire axial direction of the middle lateral groove 26. Thereby, the wear resistance and the ride comfort performance are improved in a well-balanced manner.

It is preferable that, when the axial lengths of the tie bars are compared, the middle tie bar 30 is larger than any of the axially inner tie bar 21, the outer tie bar 22 and the middle tie bar 23 provided in the shoulder lateral groove 12.

On the other hand, it is preferable that the axial length L7 of the middle tie bar 30 is smaller than the total axial length of the axially inner tie bar 21, the outer tie bar 22 and the intermediate tie bar 23. Thereby, the rigidity distribution of the shoulder land portion 7 and the middle land portion 8 is optimized, and the wear resistance is further improved.

Each of the middle blocks 25 is provided with at least one middle sipe 28 as shown in FIG. 2.

The middle sipe 28 is connected to at least one of the two middle lateral grooves 26 located on both sides in the tire circumferential direction of the middle blocks 25.

In the present embodiment, the middle sipe 28 is connected to the two middle lateral grooves 26 located on both sides in the tire circumferential direction. That is, the middle sipe 28 completely crosses the middle block 25 in the tire circumferential direction.

Further, it is preferable that each of the both ends in the tire circumferential direction of the middle sipe 28 is connected to a central portion of the middle lateral groove 26 when the middle lateral groove 26 is divided into three equal parts in the length direction.

Such middle sipe 28 serves for relaxing the rigidity in the tire axial direction of the middle block 25 and improving the ride comfort performance.

The middle sipe 28 in this example is inclined with respect to the tire circumferential direction.

It is preferable that the middle sipe 28 is inclined in the same direction as the shoulder sipe 15. The angle θ3 between the middle sipe 28 and the middle lateral groove 26 is, for example, set in a range from 75 to 90 degrees. Such middle sipe 28 serves for improving the wear resistance and the ride comfort performance in a well-balanced manner.

Preferably, that the number Ns of the shoulder lateral grooves 12 disposed in each shoulder land portion 7 is larger than the number Nm of the middle lateral grooves 26 disposed in each middle land portion 8. As a result, the length in the tire circumferential direction of each shoulder block 10 can be made relatively small, and the overall wear resistance of the land portions and various dynamic performances including steering stability can be maintained while improving the resistance to vehicle overturning.

More preferably, the number Ns is not more than 110% of the number Nm. Thereby, the above-mentioned performance is improved in a well-balanced manner.

It is preferable that the middle sipe 28 is connected to the middle lateral groove 26 at the same forming position as the middle tie bar 30 as shown in FIG. 5.
Thereby, the connecting position between the middle lateral groove 26 and the middle sipe 28 is reinforced by the middle tie bar 30, and uneven wear near the connecting position is suppressed.

In the present embodiment, as shown in FIG. 2, each of the middle blocks 25 is not provided with a groove or a sipe except for the middle sipe 28. Thereby, the above-mentioned effect can be further enhanced.

Figure 6:
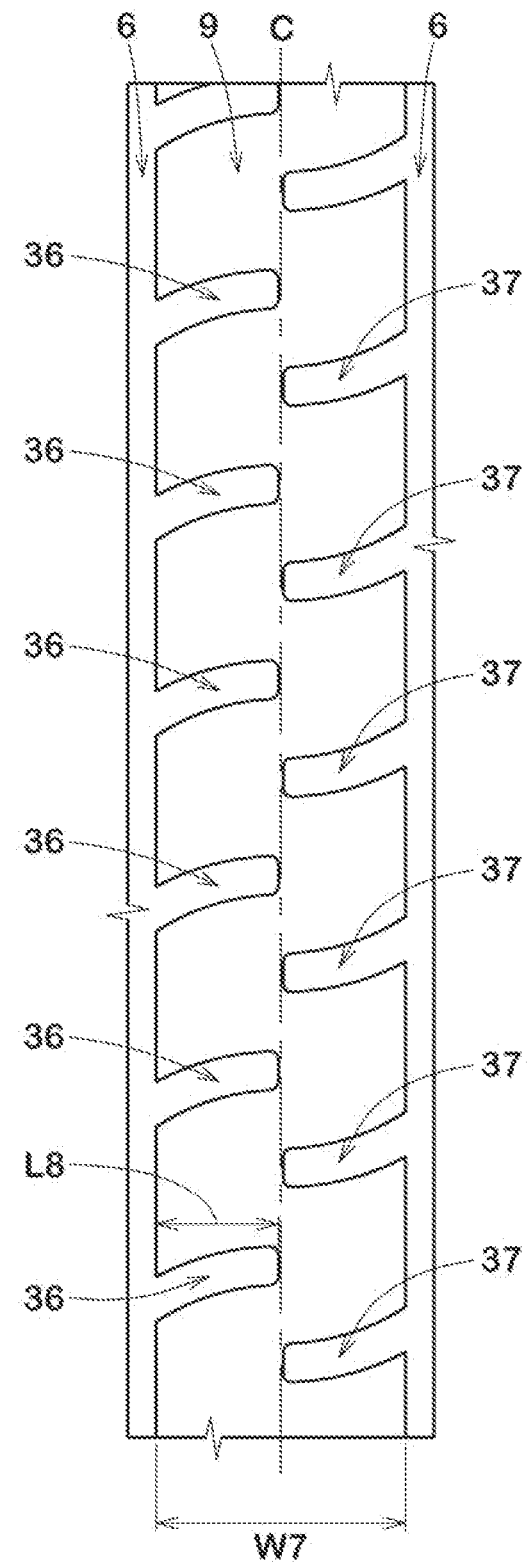
FIG. 6 is an enlarged view showing a crown land portion shown in FIG. 1.

FIG. 6 is a top view of a part of the crown land portion 9.
It is preferable that the width W7 in the tire axial direction of the crown land portion 9 is set in a range from 10% to 20% of the tread width TW (shown in FIG. 1).
It is preferable that the width W7 of the crown land portion 9 is smaller than the width W2 in the tire axial direction of the shoulder block 10.

The crown land portion 9 is provided with first crown lateral grooves 36 and second crown lateral grooves 37.
The first crown lateral grooves 36 extend from the crown circumferential groove 6 on one side in the tire axial direction (left side in FIG. 6) of the crown land portion 9, toward the tire equator C, and ends within the crown land portion 9.
The second crown lateral grooves 37 extend from the crown circumferential groove 6 on the other side in the tire axial direction (right side in FIG. 6) of the crown land portion 9, toward the tire equator C, and ends within the crown land portion 9.
The first crown lateral grooves 36 and the second crown lateral grooves 37 can enhance the wet performance, while maintaining the rigidity of the crown land portion 9.

In order to improve the wear resistance and the ride comfort in a well-balanced manner, the axial length L8 of the first crown lateral groove 36 and the axial length L8 of the second crown lateral groove 37 are preferably set in a range from 45% to 55% of the axial width W7 of the crown land portion 9.

The first crown lateral grooves 36 are curved convexly toward one side in the tire circumferential direction (upper side in FIG. 6), whereas
the second crown lateral grooves 37 are curved convexly toward the other side in the tire circumferential direction (lower side in FIG. 6). Thereby, uneven wear of the crown land portion 9 is further suppressed.

In the present embodiment, as shown in FIG. 1, the middle lateral grooves 26 adjacent to the first crown lateral grooves 36 are curved convexly toward the above-said other side in the tire circumferential direction (lower side in FIG. 1), whereas the middle lateral grooves 26 adjacent to the second crown lateral grooves 37 are curved convexly toward the above-said one side in the tire circumferential direction (upper side in FIG. 1).
By arranging the lateral grooves in this way, the progress of wear in each land portion becomes uniform, and uneven wear in each land portion is suppressed.

While detailed description has been made of a preferable embodiment of the present disclosure, the present disclosure can be embodied in various forms without being limited to the illustrated embodiment.

Comparison Tests

Based on the tread pattern shown in FIG. 1, pneumatic tires of size 235/60R17C (rim size 17×6.0 J) having specifications shown in Table 1 were experimentally manufactured as test tires (Working examples Ex.1-Ex.5 and Comparative examples Ref.1-Ref.2), and tested for the wear resistance of the shoulder blocks and the resistance to vehicle overturning as follows.

<Wear Resistance of Shoulder Blocks>

Each test tire mounted on a wheel rim of size 17×6.0 J and inflated to 525 kPa, was run on a simulated road surface of a tire test drum for a predetermined distance under certain conditions, and then, the remaining radial heights of the shoulder blocks were measured to obtain the average value. The results are indicated in Table 1 by an index based on Comparative Example Ref.1 being 100, wherein the larger the value, the better the wear resistance of the shoulder blocks.

<Resistance to Vehicle Overturning>

A test car (3000 cc 4 WD car) with the same test tires mounted on all wheels and inflated to 525 kPa was entered into an asphalt paved test course at a speed of 80 km/h and, with sharp steering operation, the steering wheel was rotated in one direction at a predetermined steering angle, and then immediately the steering wheel was turned in the opposite direction at the same steering angle. And it was observed whether the tires were lifted from the road surface more than 5 cm due to the roll of the vehicle body. The results are shown in Table 1.

TABLE 1

| tire | Ref. 1 | Ref. 2 | Ex. 1 | Ex. 2 | Ex. 3 | Ex. 4 | Ex. 5 |
|---|---|---|---|---|---|---|---|
| W2/Twh(%) | 33 | 50 | 43 | 35 | 40 | 45 | 48 |
| Wear resistance | 100 | 120 | 111 | 103 | 108 | 114 | 117 |
| Overturning resistance (lifted more than 5 cm?) | no | yes | no | no | no | no | no |

As shown in Table 1, in the working examples, the wear resistance was improved, and at the same time, the tire lifting more than 5 cm did not occur and thus the resistance to vehicle overturning was improved.
On the other hand, in the comparative example Ref.1 in which the width of the ground contacting top surface of the shoulder block was small, the wear resistance of the shoulder blocks was low.
In the comparative example Ref.2 in which the width of the ground contacting top surface of the shoulder block was large, the tire lifting more than 5 cm occurred.
Thus, from the test results, it was confirmed that the tires according to the present disclosure exhibited excellent resistance to vehicle overturning and excellent wear resistance of the shoulder blocks.

Statement of the Present Disclosure

The present disclosure is as follows:
Disclosure 1: A tire comprising
 a tread portion having a first tread edge, and provided with
  a shoulder circumferential groove disposed adjacently to the first tread edge and extending continuously in the tire circumferential direction, so as to define a shoulder land portion between the shoulder circumferential groove and the first tread edge, wherein
  the shoulder land portion is provided with shoulder lateral grooves extending from the shoulder circumferential groove to the first tread edge, so as to circumferentially divide the shoulder land portion into shoulder blocks,
  each of the shoulder blocks is provided with one or more shoulder sipes each extending from one of the shoulder lateral grooves and ending within the shoulder block.
  the shoulder lateral grooves include a tie-bar-equipped shoulder lateral groove provided with at least one tie bar rising from the groove bottom so as to connect between two of the shoulder blocks adjacent to the tie-bar-equipped shoulder lateral groove,
  the width in the tire axial direction of the ground contacting top surface of each of the shoulder blocks is in a range from 35% to 48% of a half tread width between the first tread edge and the tire equator, and
  the ground contacting top surface of each of the shoulder blocks is provided with one or more shoulder sipes extending in the tire circumferential direction.

Disclosure 2: The tire according to Disclosure 1, wherein the shoulder lateral grooves include a tie-bar-equipped shoulder lateral groove provided with tie bars raising from the groove bottoms so as to connect between two of the shoulder blocks adjacent to each other through the tie-bar-equipped shoulder lateral groove.

Disclosure 3: The tire according to Disclosure 2, wherein in the case of the shoulder sipe connected to the tie-bar-equipped shoulder lateral groove, the shoulder sipe is connected at a formation position of one of said tie bars in the tire axial direction.

Disclosure 4: The tire according to Disclosure 2 or 3, wherein said tie bars include an axially inner tie bar which is disposed axially inside the center position in the tire axial direction of the tie-bar-equipped shoulder lateral groove.

Disclosure 5: The tire according to any one of Disclosures 2 to 4, wherein said tie bars include an axially outer tie bar which is disposed axially outside the center position in the tire axial direction of the tie-bar-equipped shoulder lateral groove.

Disclosure 6: The tire according to any one of Disclosures 2 to 5, wherein said tie bars include an intermediate tie bar which is disposed between both ends in the tire axial direction of the tie-bar-equipped shoulder lateral groove.

Disclosure 7: The tire according to any one of Disclosures 1 to 6, wherein the tread portion comprises a middle land portion adjacent to the shoulder land portion through the shoulder circumferential groove, and
  the middle land portion is provided with middle lateral grooves completely crossing the middle land portion in the tire axial direction,
  the middle land portion comprises middle blocks circumferentially divided by the middle lateral grooves, and
  the middle lateral grooves include a tie-bar-equipped middle lateral groove provided with at least one middle tie bar raising from the groove bottom so as to connecting between two of the middle blocks adjacent to each other through the tie-bar-equipped middle lateral groove.

Disclosure 8: The tire according to Disclosure 7, wherein each of the middle blocks is provided with a middle sipe connected to one of the middle lateral grooves, and
  in the case of the middle sipe connected to the tie-bar-equipped middle lateral groove, the middle sipe is connected at a formation position in the tire axial direction of only one middle tie bar or one of the middle tie bars.

Disclosure 9: The tire according to Disclosure 7 or 8, wherein the number of the shoulder lateral grooves disposed in the shoulder land portion is larger than the number of the middle lateral grooves disposed in the middle land portion.

DESCRIPTION OF THE REFERENCE SIGNS 2 tread portion
5 shoulder circumferential groove
7 shoulder land portion
12 shoulder lateral groove
10 shoulder block
15 shoulder sipe
TWh half tread width
T1 first tread edge

The invention claimed is:

1. A tire comprising:
  a tread portion including a pair of shoulder land portions and a pair of middle land portions between the shoulder land portions, each of the middle land portions provided with middle lateral grooves extending thereacross to circumferentially divide the middle land portion into middle blocks, each of the shoulder land portions provided with shoulder lateral grooves extending thereacross to circumferentially divide the shoulder land portion into shoulder blocks, and each of the shoulder blocks provided with only two shoulder sipes which are a first shoulder sipe and a second shoulder sipe,
  wherein the first shoulder sipe and the second shoulder sipe respectively extend from two of the shoulder lateral grooves adjacent to the shoulder block on one side and the other side, respectively, of the shoulder block, and end within the shoulder block,
  a first connecting position of the first shoulder sipe with the shoulder lateral groove on the one side, and a second connecting position of the second shoulder sipe with the shoulder lateral groove on the other side are shifted from each other in the tire axial direction by an axial distance in a range from 5% to 10% of a width in the tire axial direction of the ground contacting top surface of the shoulder block,
  each of the shoulder lateral grooves provided with a tie bar rising from the groove bottom so as to connect between two of the shoulder blocks adjacent to the shoulder lateral groove,
  a length in the tire axial direction of said tie bar is in a range from 15% to 25% of the width in the tire axial direction of the ground contacting top surface of each shoulder block, and
  in each shoulder lateral groove, the first connecting position and the second connecting position are located within the length of said tie bar in the tire axial direction,
  each of the middle blocks provided with only one middle sipe, and
  all of the shoulder sipes and middle sipes extend linearly in a same direction inclining with respect to the tire circumferential direction.

2. The tire according to claim 1, wherein
  in each of the shoulder blocks, the first shoulder sipe and the second shoulder sipe are arranged in line.

3. The tire according to claim 1, wherein
  the shoulder lateral grooves are straight grooves.

4. The tire according to claim 3, wherein
  the middle lateral grooves disposed in one of the two middle land portions are curved convexly to one side in the tire circumferential direction while extending across the middle land portion, whereas the middle lateral grooves disposed in the other of the middle land portions are curved convexly to the other side in the tire circumferential direction while extending across the middle land portion.

5. The tire according to claim 4, wherein
the tread portion further includes a crown land portion between the two middle land portions,
the crown land portion is provided with first crown lateral grooves and second crown lateral grooves arranged alternately in the tire circumferential direction,
the first crown lateral grooves extend toward the tire equator from a crown circumferential groove disposed on one side of the crown land portion, while curving convexly to one side in the tire circumferential direction, whereas
the second crown lateral grooves extend toward the tire equator from a crown circumferential groove disposed on the other side of the crown land portion, while curving convexly to the other side in the tire circumferential direction.

6. The tire according to claim 5, wherein
the first crown lateral grooves are curved in the opposite direction to the middle lateral grooves adjacent to the first crown lateral grooves, and
the second crown lateral grooves are curved in the opposite direction to the middle lateral grooves adjacent to the second crown lateral grooves.

7. The tire according to claim 6, wherein
a pair of shoulder circumferential grooves each disposed between the axially adjacent shoulder land portions and middle land portions are straight grooves, and
a pair of crown circumferential grooves disposed one on each side of the crown land portion are straight grooves.

8. The tire according to claim 1, wherein
each of the middle lateral grooves is provided with a middle tie bar raising from the groove bottom so as to connecting between two of the middle blocks adjacent to the middle lateral groove.

9. The tire according to claim 8, wherein
a length in the tire axial direction of the middle tie bar is in a range from 40% to 55% of a width in the tire axial direction of the middle blocks.

10. The tire according to claim 9, wherein
each of the middle blocks is crossed by said only one middle sipe extending between the adjacent two middle lateral grooves, and
said only one middle sipe is connected to each of the adjacent two middle lateral grooves within the length of the middle tie bar in the middle lateral groove.

11. The tire according to claim 1, wherein
each of the shoulder lateral grooves is provided with an axially inner tie bar disposed axially inside said tie bar, and an axially outer tie bar disposed axially outside said tie bar.

12. The tire according to claim 1, wherein
the number of the shoulder lateral grooves disposed in each shoulder land portion is larger than the number of the middle lateral grooves disposed in each middle land portion.

13. A tire comprising:
a tread portion having a first tread edge, and provided with a shoulder circumferential groove disposed adjacently to the first tread edge and extending continuously in the tire circumferential direction, so as to define a shoulder land portion between the shoulder circumferential groove and the first tread edge, and a middle land portion adjacent to the shoulder land portion through the shoulder circumferential groove,
wherein the shoulder land portion is provided with shoulder lateral grooves extending from the shoulder circumferential groove to the first tread edge, so as to circumferentially divide the shoulder land portion into shoulder blocks,
each of the shoulder lateral grooves is provided with a tie bar rising from the groove bottom so as to connect between two of the shoulder blocks adjacent to the shoulder lateral groove,
the width in the tire axial direction of the ground contacting top surface of each of the shoulder blocks is in a range from 35% to 48% of a half tread width between the first tread edge and the tire equator,
the ground contacting top surface of each of the shoulder blocks is provided with two shoulder sipes extending in the tire circumferential direction, wherein the two shoulder sipes are a first shoulder sipe and a second shoulder sipe,
the first shoulder sipe and the second shoulder sipe respectively extend from two of the shoulder lateral grooves adjacent to the shoulder block on one side and the other side, respectively, of the shoulder block, and end within the shoulder block, a first connecting position of the first shoulder sipe with the shoulder lateral groove on the one side, and a second connecting position of the second shoulder sipe with the shoulder lateral groove on the other side are shifted from each other in the tire axial direction by an axial distance in a range from 5% to 10% of the width in the tire axial direction of the ground contacting top surface of the shoulder block,
a length in the tire axial direction of said tie bar provided in each shoulder lateral groove is in a range from 15% to 25% of the width in the tire axial direction of the ground contacting top surface of each shoulder block,
in each shoulder lateral groove, the first connecting position and the second connecting position are located at a formation position in the tire axial direction of said tie bar,
the middle land portion is provided with middle lateral grooves extending thereacross to circumferentially divide the middle land portion into middle blocks,
each of the middle blocks is provided with only one middle sipe,
each of the shoulder blocks is provided with only said two shoulder sipes, and
all the shoulder sipes and middle sipes extend linearly in a same direction inclining with respect to the tire circumferential direction.

14. The tire according to claim 13, wherein
each of the shoulder lateral grooves is provided with an axially inner tie bar disposed axially inside said tie bar.

15. The tire according to claim 14, wherein
each of the shoulder lateral grooves is provided with an axially outer tie bar disposed axially outside said tie bar.

16. The tire according to claim 13, wherein
each of the shoulder lateral grooves is provided with an axially outer tie bar disposed axially outside said tie bar.

17. The tire according to claim 13, wherein
each of the middle lateral grooves is provided with a middle tie bar raising from the groove bottom so as to connecting between two of the middle blocks adjacent to the middle lateral groove.

18. The tire according to claim 17, wherein
each of the middle blocks is crossed by said only one middle sipe extending between the adjacent two middle lateral grooves, and
the middle sipe is connected to each of the adjacent middle lateral grooves at a formation position in the tire axial direction of the middle tie bar.
19. The tire according to claim 17, wherein
the number of the shoulder lateral grooves disposed in the shoulder land portion is larger than the number of the middle lateral grooves disposed in the middle land portion.
20. The tire according to claim 13, wherein
in each of the shoulder blocks, the first shoulder sipe and the second shoulder sipe are arranged in line.

* * * * *